US009019605B2

(12) United States Patent
Ye

(10) Patent No.: US 9,019,605 B2
(45) Date of Patent: Apr. 28, 2015

(54) OPTICAL ISOLATOR CAPABLE OF CREATING A LARGE BUFFER AREA FOR OPTICAL BEAMS AND METHODS OF MANUFACTURING AND USING THE SAME

(71) Applicant: Lei Ye, Alameda, CA (US)

(72) Inventor: Lei Ye, Alameda, CA (US)

(73) Assignee: Source Photonics, Inc., Chatsworth, CA (US)

( * ) Notice: Subject to any disclaimer, the term of this patent is extended or adjusted under 35 U.S.C. 154(b) by 225 days.

(21) Appl. No.: 13/746,271

(22) Filed: Jan. 21, 2013

(65) Prior Publication Data

US 2014/0146389 A1  May 29, 2014

(30) Foreign Application Priority Data

Nov. 28, 2012 (CN) .......................... 2012 1 0491066

(51) Int. Cl.
   *G02F 1/09* (2006.01)
(52) U.S. Cl.
   CPC ........... *G02F 1/093* (2013.01); *Y10T 29/49002* (2015.01); *Y10T 156/10* (2015.01)
(58) Field of Classification Search
   CPC .... G02F 1/093; Y10T 29/49002; Y10T 56/10
   USPC ................. 359/484.03; 156/60; 29/592.1
   See application file for complete search history.

(56) References Cited

U.S. PATENT DOCUMENTS

| 2001/0036010 | A1* | 11/2001 | Watanabe et al. | ............. 359/484 |
| 2002/0076161 | A1* | 6/2002 | Hirabayashi et al. | ........... 385/40 |
| 2003/0053208 | A1* | 3/2003 | Hata et al. | ...................... 359/484 |
| 2003/0174397 | A1* | 9/2003 | Sugawara et al. | ............. 359/484 |
| 2005/0169584 | A1* | 8/2005 | Takimoto et al. | ............... 385/78 |

FOREIGN PATENT DOCUMENTS

JP         2000-171631     *   6/2000  ............... G02B 5/30

OTHER PUBLICATIONS

Machine Translation of JP 2000-171631 from http://www4.ipdl.inpit.go.jp/Tokujitu/tjsogodbenk.ipdl/ on Nov. 28, 2014.*

* cited by examiner

*Primary Examiner* — Frank Font
(74) *Attorney, Agent, or Firm* — Andrew D. Fortney; Central California IP Group, P.C.

(57) ABSTRACT

An optical isolator capable of creating a larger safe buffer area for optical beam(s) and a manufacturing method thereof are disclosed. The optical isolator includes a sandwich type wafer, a first polarizer, a Faraday rotator and a second polarizer. The first polarizer works as the incident plane of the FSI (free space isolator), while the second polarizer works as the outgoing plane of the FSI. The direction in which the second polarizer passes the polarized beam is at a 45° angle with respect to the first polarizer. The manufacturing method includes marking the edge of the second polarizer. FSIs processed by this method provide a larger buffer area for the optical beam(s) and/or a lower manufacturing cost, even though the size of the FSI is unchanged.

20 Claims, 1 Drawing Sheet

OPTICAL ISOLATOR CAPABLE OF CREATING A LARGE BUFFER AREA FOR OPTICAL BEAMS AND METHODS OF MANUFACTURING AND USING THE SAME

CROSS REFERENCE TO RELATED APPLICATIONS

This application claims the benefit of Chinese Patent Application No 201210491066.6, filed on Nov. 28, 2012, which is incorporated herein by reference in its entirety.

FIELD OF THE INVENTION

The present invention relates to a free space isolator (FSI) and the design thereof, and in particular, to a free space isolator and a design therefor capable of creating a relatively large safe buffer area for optical beams.

DISCUSSION OF THE BACKGROUND

A free space isolator (FSI) is a device configured to prevent optical beams from laser sources from being reflected within an optical subassembly in a manner that can damage major parts. As shown in FIG. 1, a conventional FSI 10 includes a sandwich type optical wafer and magnet 7, a 0-degree polarizer 1, a Faraday rotator 2, and a 45-degree polarizer 3. The difference between 0-degree and 45-degree polarizers can hardly be recognized by visual inspection, so one of the polarizers has a mark 6 formed by removing part of the edge. In general, the 0-degree polarizer works as an incident plane to polarize the incoming beam, the Faraday rotator is configured to rotate the incident beam, and the 45-degree polarizer can be utilized to transmit the rotated incident beam.

In the field of optical fiber communication, a laser beam 5 is converted from divergent light into collimated light by lens refraction before entering the FSI 10. In this process, the diameter of the laser beam 5 is relatively large on the incident plane 1 but relatively small on the outgoing plane 3. In this design, a buffer area for the incident laser beam 5 is formed by removing the size of the mark 6 from the edge of the outer diameter of the polarizer and then subtracting the size of the incident laser beam 5. That is, the remaining area is the buffer area for the laser beam 5.

The buffer area is very important for the laser beam. With regard to the laser beam, the wider the buffer area is, the better the effect will be. If the laser beam 5 deflects or reflects off a structure in the optical subassembly, it still can be kept in the buffer area, thereby preventing the laser beam 5 from deviating too far from the FSI 10. The size of the FSI 10 will go up if the buffer area is added under available conditions, resulting in a higher cost of the FSI.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to provide a relatively large buffer area for a laser beam, based on an unchanged size of the outer diameter of the FSI optical wafer. The present invention is further intended to provide an optical isolator capable of creating a larger safe buffer area for optical beams, and a method of manufacturing the same, thereby overcoming the above-mentioned shortages in the prior art. To implement the objective(s) of the present invention, technical proposal(s) are provided below.

In one aspect, the present invention relates to an optical isolator capable of creating a relatively large buffer area for optical beams in an optical transmitter or transceiver, comprising a sandwich-type (e.g., parallel plate) wafer, a first polarizer configured to work as an incident plane, a Faraday configured rotator, and a second polarizer configured to work as an outgoing plane, wherein the second polarizer has a mark. The first polarizer may also polarize or align the optical (e.g., light) beam(s), the Faraday configured rotator may rotate the light by a predetermined angle or number of degrees, and the second polarizer may further polarize or align the optical beam(s) at an angle different from the first polarizer. In one embodiment, the direction in which the second polarizer passes polarized light is at a 45° angle with respect to the first polarizer. Preferably, the first polarizer is a 0-degree polarizer, and the second polarizer is a 45-degree polarizer, or vice versa, and the edge of the second polarizer may have a mark (e.g., on the upper or lower edge of the second polarizer).

According to various embodiments of the present invention, a method of manufacturing the optical isolator including the sandwich type wafer, first polarizer, Faraday rotator and second polarizer, comprises marking the second polarizer in a manner reducing the peripheral area of the second polarizer; adhering, mounting, affixing, stacking or otherwise placing (i) the first polarizer onto a first surface of the Faraday rotator and (ii) the second polarizer onto a second surface of the Faraday rotator opposite to the first surface of the Faraday rotator; and mounting the first polarizer, the Faraday rotator, and the second polarizer in a free space isolator between opposed isolator plates so that the incident optical beam(s) pass through the first polarizer, the Faraday rotator, and the second polarizer in sequence. The second polarizer may have a height or an area less than that of the first polarizer, and optionally, the Faraday rotator. A method of using the optical isolator may comprise passing a laser beam through the first polarizer, the Faraday rotator, and the second polarizer in sequence, the second polarizer having a mark thereon that reduced a peripheral area of the second polarizer, the optical isolator having a greater buffer space than an otherwise identical optical isolator in which the same mark is on the first polarizer.

Relative to the prior art, the present invention advantageously provides an increased buffer area for optical beams even though the size of the FSI is unchanged. In the prior art, additional area is always obtained by increasing the size of the FSI, and thus, increasing the cost. On the contrary, the present invention can provide a larger buffer area without increasing the cost. These and other advantages of the present invention will become readily apparent from the detailed description of various embodiments below.

DETAILED DESCRIPTION

The technical proposal(s) of embodiments of the present invention will be fully and clearly described in conjunction with the following embodiments. It will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

Figure 2:
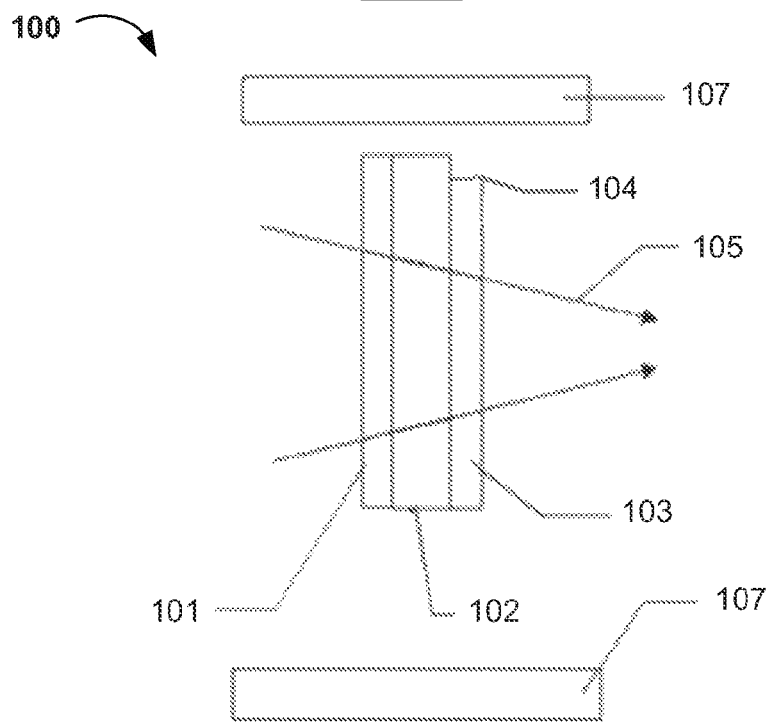
FIG. 2 is a structure diagram of an exemplary FSI in accordance with the present invention.

FIG. 2 illustrates an optical isolator 100 and a method of manufacturing the same that is capable of creating a relatively large buffer area for optical beams (e.g., light beam 105). The FSI 100 is a sandwich type optical module. The PSI 100 comprises magnet 107 and an optical wafer, first polarizer 101, Faraday rotator 102 and second polarizer 103. The first polarizer 101 works as the incident plane of the FSI 100, while the second polarizer 103 works as the outgoing plane of the FSI. Further, the second polarizer 103 has a mark 104 on the outer edge thereof. Thus, the method of manufacturing may comprise placing the mark 104 on the outer edge of the second polarizer 103.

Preferably, the first polarizer 101 is a 0-degree polarizer, while the second polarizer is a 45-degree polarizer. Alternatively, the first polarizer can be a 45-degree polarizer, while the second polarizer can be a 0-degree polarizer. In various embodiments, the mark 104 (e.g., a notch or cut-out a square or rectangular wafer, or a flattened region of a circular or oval disk) can be placed on the upper and/or lower edge of the second polarizer 103.

A method of creating a relatively large buffer area in an FSI is disclosed. In the field of optical fiber communication, the laser beam 105 is converted from divergent light into collimated light by lens refraction before entering the FSI 100. In optical communication using semiconductor lasers in the prior art, as a condenser lens is added, the characteristic of most laser beams 5 (see FIG. 1) is that a dimension (e.g., the area or beam width) of the laser beam 5 on the incident plane 1 is greater than the same dimension (e.g., area or width) of the laser beam 5 on the outgoing plane 3. Therefore, for one laser beam 5, the buffer area on the incident plane 1 is smaller than that on the outgoing plane 3. Furthermore, if the edge of the incident plane 1 is marked, the buffer area will be even smaller, such that it risks radiating part of the laser beam 5 to ineffective areas or to a place outside the wafer 7.

Figure 1:
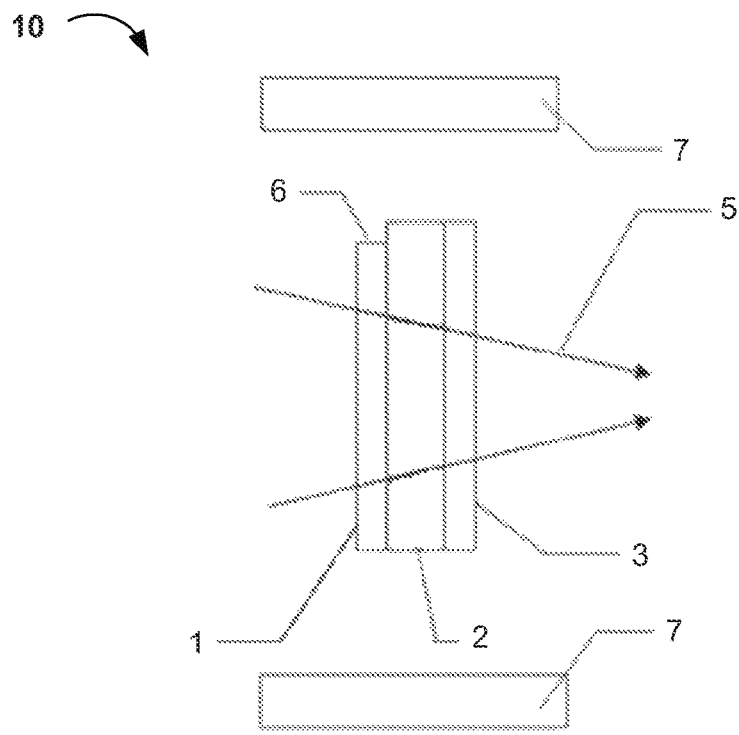
FIG. 1 is a structure diagram showing a conventional free space isolator (FSI).

However, if the edge of the outgoing plane 103 (FIG. 2) has the mark 104 thereon, the corresponding position or location on the edge of the incident plane 101 will become a buffer area, thereby enlarging the size of the buffer area by the area of the mark (e.g., mark 4 in FIG. 1). The buffer area on the outgoing plane 103 is decreased by the mark 104, but the buffer area for the outgoing optical beam 105 is still greater than the buffer area on the incident plane 101, as the buffer area on the incident plane 101 is a limitation on the whole optical path. In conclusion, buffer areas for FSI become larger when the mark 104 is on the outgoing polarizer 103, rather than on the incoming polarizer 101. In other words, even when the size of the FSI 100 is the same (i.e., is unchanged), the design provides a larger buffer area for the optical beam 105 and/or a lower cost of manufacturing the FSI 100.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical isolator, comprising:
    a) a sandwich-type optical wafer, comprising:
        i) a first polarizer that functions as an incident plane to an optical beam;
        ii) a Faraday rotator; and
        iii) a second polarizer that functions as an outgoing plane to the optical beam, wherein the second polarizer has an edge with a mark thereon and an area smaller than that of the first polarizer, and the mark is a part removed from an edge of the second polarizer, and one side of the edge of the second polarizer flanks or is aligned with the Faraday rotator; and
    b) a magnet adjacent to an edge of the sandwich-type optical wafer.

2. The optical isolator of claim 1, wherein the first polarizer has a larger buffer area for an incoming optical beam than an otherwise identical optical isolator with an identical mark on the first polarizer, and the buffer area is an area including edges of the first polarizer outside an area of the incident beam.

3. The optical isolator of claim 1, wherein the first polarizer passes the optical beam to the Faraday isolator at a first polarization angle, and the second polarizer passes the optical beam through at a 45° angle with respect to the first polarization angle.

4. The optical isolator of claim 3, wherein the first polarizer is a 0-degree polarizer, while the second polarizer is a 45-degree polarizer.

5. The optical isolator of claim 3, wherein the first polarizer is a 45-degree polarizer, while the second polarizer is a 0-degree polarizer.

6. The optical isolator of claim 1, wherein the area of the second polarizer is smaller than that of the Faraday rotator.

7. The optical isolator of claim 1, wherein the second polarizer has a smaller area than the first polarizer.

8. The optical isolator of claim 7, wherein the area of the second polarizer differs from an area of the first polarizer by an area of the mark.

9. The optical isolator of claim 1, wherein the part removed from the edge of the second polarizer is in a buffer area of the second polarizer.

10. The optical isolator of claim 9, wherein the part removed from the edge of the second polarizer is removed from the edge of the optical isolator adjacent to the magnet.

11. The optical isolator of claim 1, further comprising a laser providing the optical beam, and a condenser lens between the laser and the sandwich-type optical wafer.

12. A method of manufacturing an optical isolator, comprising:
    a) marking a second polarizer in a manner reducing a peripheral area of the second polarizer;
    b) adhering, mounting, affixing, stacking or otherwise placing (i) a first polarizer onto a first surface of a Faraday rotator and (ii) the second polarizer onto a second surface of the Faraday rotator opposite to the first surface of the Faraday rotator; and c) mounting the first polarizer, the Faraday rotator, and the second polarizer in a free space isolator between opposed isolator plates so that the incident optical beam(s) pass through the first polarizer, the Faraday rotator, and the second polarizer in sequence.

13. The method according to claim 12, wherein the first polarizer functions as an incident plane of the optical isolator.

14. The method according to claim 12, wherein the second polarizer functions as an outgoing plane of the optical isolator.

15. The method according to claim 12, wherein the second polarizer passes a polarized beam through at a 45° angle with respect to an angle through which the first polarizer passes an incident beam.

16. The method according to claim 12, having a larger buffer area for an incoming optical beam than an otherwise identical optical isolator with an identical mark on the first polarizer.

17. The method according to claim 12, wherein the first polarizer is a 0-degree polarizer, and the second polarizer is a 45-degree polarizer.

18. The method according to claim 12, wherein the first polarizer is a 45-degree polarizer, and the second polarizer is a 0-degree polarizer.

19. The method according to claim 12, wherein the mark is made on an upper edge or a lower edge of the second polarizer.

20. The method according to claim 12, wherein the second polarizer has a smaller area than the first polarizer.

* * * * *